US012682859B2

(12) United States Patent
Chang et al.

(10) Patent No.: US 12,682,859 B2
(45) Date of Patent: Jul. 14, 2026

(54) ELECTRONIC DEVICE WITH PREFERABLE DISPLAY BRIGHTNESS BASED ON BRIGHTNESS COMPENSATION TABLE OR PIXEL COMPENSATION TABLE

(71) Applicant: CARUX TECHNOLOGY PTE. LTD., Singapore (SG)

(72) Inventors: Yi-Cheng Chang, Tainan (TW); Shun-Yu Chang, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/769,375

(22) Filed: Jul. 10, 2024

(65) Prior Publication Data

US 2025/0054453 A1 Feb. 13, 2025

Related U.S. Application Data

(60) Provisional application No. 63/531,318, filed on Aug. 8, 2023.

(30) Foreign Application Priority Data

Apr. 29, 2024 (CN) ......................... 202410525603.7

(51) Int. Cl.
*G09G 3/34* (2006.01)
*G09G 3/00* (2006.01)

(52) U.S. Cl.
CPC ........... *G09G 3/3426* (2013.01); *G09G 3/006* (2013.01); *G09G 2320/0233* (2013.01);
(Continued)

(58) Field of Classification Search
None
See application file for complete search history.

(56) References Cited

U.S. PATENT DOCUMENTS 11,062,660 B1 * 7/2021 Sohn ...................... G09G 3/006
2009/0243982 A1 * 10/2009 Lee ...................... G09G 3/3406
345/88

(Continued)

FOREIGN PATENT DOCUMENTS

TW 1433115 4/2014
TW 1502570 10/2015

*Primary Examiner* — Donna V Bocar
(74) *Attorney, Agent, or Firm* — JCIPRNET

(57) ABSTRACT

An electronic device, including a first substrate, light emitting elements, a light emission driving element, a detection element, a control module, and a first memory element, is provided. The light emitting elements are disposed on the first substrate. The light emission driving element is electrically connected to the light emitting elements. The detection element is electrically connected to the light emitting elements and is configured to detect whether the light emitting elements are defective. The control module is electrically connected to the detection element and the light emission driving element. The first memory element is electrically connected to the control module and is configured to store a first brightness compensation table. In response to the detection element detecting that at least one of the light emitting elements is defective, the detection element outputs an adjustment signal to the control module. The control module generates a new first brightness compensation table.

16 Claims, 11 Drawing Sheets

(52) U.S. Cl.
CPC . *G09G 2320/0285* (2013.01); *G09G 2330/10* (2013.01); *G09G 2330/12* (2013.01); *G09G 2380/10* (2013.01)

(56) References Cited

U.S. PATENT DOCUMENTS

| | | | | |
|---|---|---|---|---|
| 2012/0075362 | A1* | 3/2012 | Ichioka | G09G 3/3426<br>345/102 |
| 2012/0139975 | A1* | 6/2012 | Hashimoto | G09G 3/3648<br>345/690 |
| 2013/0181612 | A1* | 7/2013 | Ohno | G09G 3/3406<br>315/297 |
| 2015/0042697 | A1* | 2/2015 | Park | G09G 3/2092<br>345/77 |
| 2020/0193904 | A1* | 6/2020 | Kho | G09G 3/3233 |
| 2022/0005422 | A1* | 1/2022 | He | G09G 3/36 |
| 2022/0230602 | A1* | 7/2022 | Chang | G02F 1/133603 |

* cited by examiner

601

| | | | | | |
|---|---|---|---|---|---|
| 1.0 | 1.0 | 1.0 | 1.0 | 1.0 | 1.0 |
| 1.0 | 1.0 | 1.0 | 1.0 | 1.0 | 1.0 |
| 1.0 | 1.0 | 1.0 | 1.0 | 1.0 | 1.0 |
| 1.0 | 1.0 | 1.0 | 1.0 | 1.0 | 1.0 |

×

602

| | | | | | |
|---|---|---|---|---|---|
| 1.0 | 1.1 | 1.1 | 1.1 | 1.0 | 1.0 |
| 1.0 | 1.1 | 1.5 | 1.1 | 1.0 | 1.0 |
| 1.0 | 1.1 | 1.1 | 1.1 | 1.0 | 1.0 |
| 1.0 | 1.0 | 1.0 | 1.0 | 1.0 | 1.0 |

=

603

| | | | | | |
|---|---|---|---|---|---|
| 1.0 | 1.1 | 1.1 | 1.1 | 1.0 | 1.0 |
| 1.0 | 1.1 | 1.5 | 1.1 | 1.0 | 1.0 |
| 1.0 | 1.1 | 1.1 | 1.1 | 1.0 | 1.0 |
| 1.0 | 1.0 | 1.0 | 1.0 | 1.0 | 1.0 |

FIG. 6

ELECTRONIC DEVICE WITH PREFERABLE DISPLAY BRIGHTNESS BASED ON BRIGHTNESS COMPENSATION TABLE OR PIXEL COMPENSATION TABLE

CROSS-REFERENCE TO RELATED APPLICATION

This application claims the priority benefit of U.S. provisional application Ser. No. 63/531,318, filed on Aug. 8, 2023, and China application serial no. 202410525603.7, filed on Apr. 29, 2024. The entirety of each of the above-mentioned patent applications is hereby incorporated by reference herein and made a part of this specification.

BACKGROUND

Technical Field

The disclosure relates to a device, and in particular to an electronic device.

Description of Related Art

Generally speaking, during the use of a display, if a light emitting element in a light emitting module for providing backlight is defective, the brightness of a display image may be uneven. Even though the system may preset compensation parameters to pre-adjust the brightness of the light emitting element during the manufacturing process of the display, the defective light emitting element caused by aging or other factors during the use of the display cannot be compensated.

SUMMARY

The disclosure provides an electronic device, which can effectively drive a light emitting module and a display panel to provide a preferable display effect.

According to an embodiment of the disclosure, an electronic device of the disclosure includes a first substrate, multiple light emitting elements, a light emission driving element, a detection element, a control module, and a first memory element. The light emitting elements are disposed on the first substrate. The light emission driving element is electrically connected to the light emitting elements. The detection element is electrically connected to the light emitting elements and is configured to detect whether the light emitting elements are defective. The control module is electrically connected to the detection element and the light emission driving element. The first memory element is electrically connected to the control module and is configured to store a first brightness compensation table. In response to the detection element detecting that at least one of the light emitting elements is defective, the detection element outputs an adjustment signal to the control module. The control module generates a new first brightness compensation table according to the adjustment signal and the first brightness compensation table. The control module outputs a control signal to the light emission driving element according to the new first brightness compensation table, so that the light emission driving element drives the light emitting elements according to the control signal.

According to an embodiment of the disclosure, an electronic device of the disclosure includes a first substrate, a second substrate, multiple light emitting elements, multiple pixel elements, a display driving element, a detection element, a control module, and a first memory element. The light emitting elements are disposed on the first substrate. The pixel elements are disposed on the second substrate. The display driving element is electrically connected to the pixel elements. The detection element is electrically connected to the light emitting elements and is configured to detect whether the light emitting elements are defective. The control module is electrically connected to the detection element and the display driving element. The first memory element is electrically connected to the control module and is configured to store a first pixel compensation table. In response to the detection element detecting that at least one of the light emitting elements is defective, the detection element outputs an adjustment signal to the control module. The control module generates a new first pixel compensation table according to the adjustment signal and the first pixel compensation table. The control module outputs display data to the display driving element according to the new first pixel compensation table, so that the display driving element drives the pixel elements according to the display data.

Based on the above, the electronic device of the disclosure can automatically detect the defective light emitting element in the light emitting module and correspondingly modify at least one of the brightness compensation table and the pixel compensation table, so that a display image can maintain preferable display brightness.

In order for the features and advantages of the disclosure to be more comprehensible, the following specific embodiments are described in detail in conjunction with the drawings.

BRIEF DESCRIPTION OF THE DRAWINGS

FIG. 6 is a schematic diagram of modifying a pixel compensation table according to an embodiment of the disclosure.

DESCRIPTION OF THE EMBODIMENTS

Figure 1:
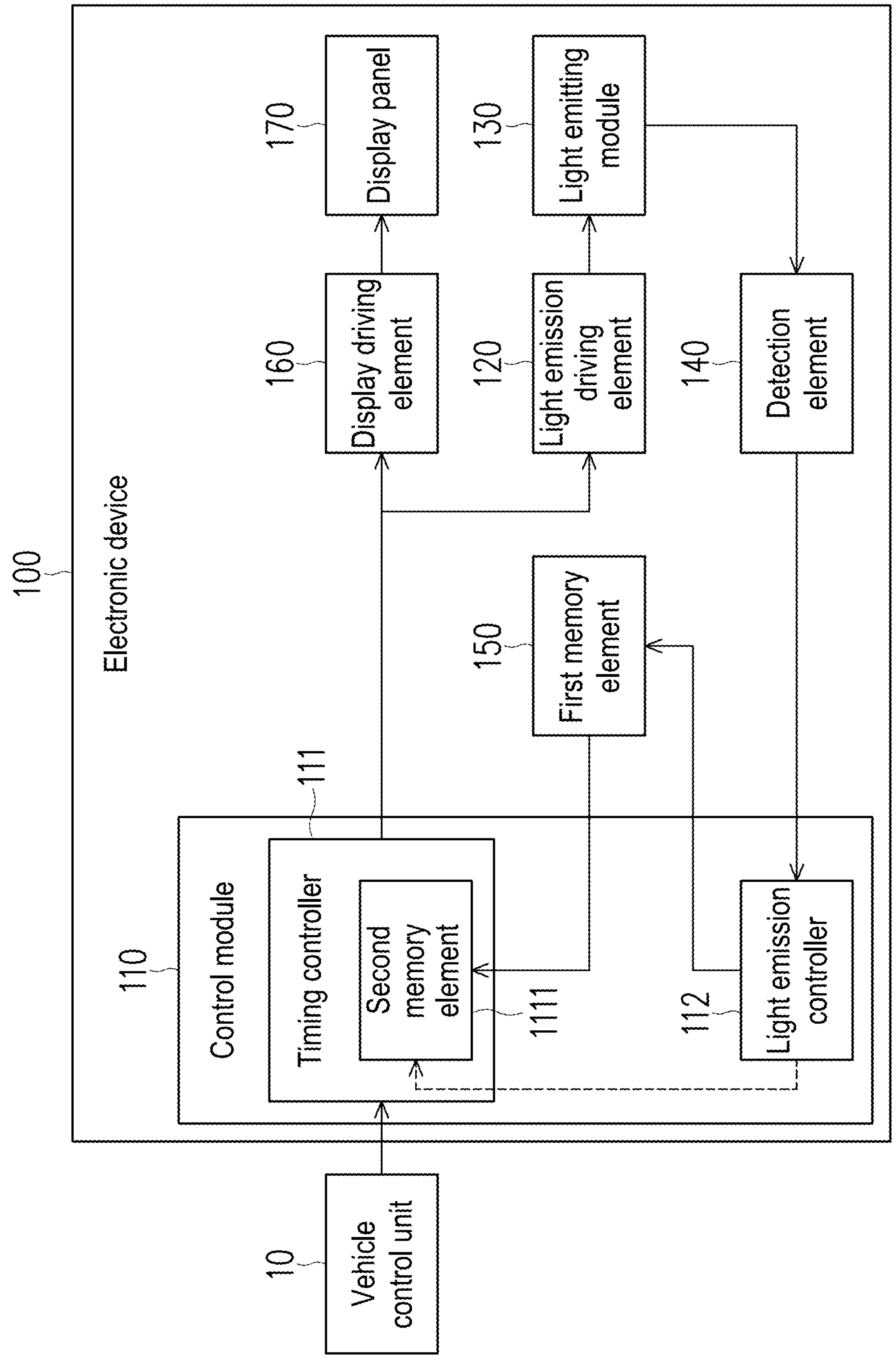
FIG. 1 is a schematic diagram of an electronic device according to an embodiment of the disclosure.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

Throughout the specification and the appended claims of the disclosure, certain terms are used to refer to specific elements. It should be understood by persons skilled in the art that electronic device manufacturers may refer to the same component by different names. The disclosure does not intend to distinguish between components with the same function but different names. In the following specification and claims, words such as "containing" and "comprising" are open-ended words, so the words should be interpreted as "including but not limited to . . . ".

Directional terms, such as "upper", "lower", "front", "rear", "left", and "right", mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

In some embodiments of the disclosure, the term "coupling" includes any direct or indirect means of electrical connection. In the case of direct electrical connection, end points of elements on two circuits are directly connected or connected to each other by a conductor segment, while in the case of indirect electrical connection, there is a switch, a diode, a capacitor, an inductor, a resistor, other suitable elements, or a combination of the above elements between the end points of the elements on the two circuits, but not limited thereto.

The terms "about", "substantially", or "roughly" are generally interpreted as within 10% of a given value or range, or interpreted as within 5%, 3%, 2%, 1%, or 0.5% of the given value or range.

Ordinal numbers such as "first" and "second" used in the specification and the claims are used to modify elements, and the terms do not imply and represent that the component (s) have any previous ordinal number, nor do they represent the order of a certain element and another element or the order of a manufacturing method. The use of the ordinal numbers is only used to clearly distinguish between an element with a certain name and another element with the same name. The claims and the specification may not use the same terms, whereby a first member in the specification may be a second member in the claims. It should be noted that in the following embodiments, the technical features of several different embodiments may be replaced, recombined, and mixed to complete other embodiments without departing from the spirit of the disclosure.

It should be noted that in the following embodiments, the features of several different embodiments may be replaced, recombined, and mixed to complete other embodiments without departing from the spirit of the disclosure. As long as the features of the embodiments do not violate the spirit of the invention or conflict with each other, the features may be arbitrarily mixed and matched for use.

Unless otherwise defined, all terms (including technical and scientific terms) used herein have the same meaning as commonly understood by persons skilled in the art to which the disclosure belongs. It can be understood that the terms, such as the terms defined in commonly used dictionaries, should be interpreted as having meanings consistent with the relevant art and the background or the context of the disclosure, and should not be interpreted in an idealized or overly formal manner, unless otherwise defined in the embodiments of the disclosure.

FIG. 1 is a schematic diagram of an electronic device according to an embodiment of the disclosure. Referring to FIG. 1, an electronic device 100 includes a control module 110, a light emission driving element 120, a light emitting module 130, a detection element 140, a first memory element 150, a display driving element 160, and a display panel 170. The control module 110 is electrically connected to a vehicle control unit (VCU) 10, the light emission driving element 120, the detection element 140, the first memory element 150, and the display driving element 160. The light emission driving element 120 is also electrically connected to the light emitting module 130. The detection element 140 is also electrically connected to the light emitting module 130. The display driving element 160 is also electrically connected to the display panel 170.

In the embodiment, the control module 110 includes a timing controller (TCON) 111 and a light emission controller 112. The timing controller 111 is electrically connected to the light emission controller 112, the vehicle control unit 10, the light emission driving element 120, the first memory element 150, and the display driving element 160. The timing controller 111 may include a second memory element 1111. The light emission controller 112 is also electrically connected to the detection element 140 and the first memory element 150. In the embodiment, the vehicle control unit (VCU) 10 may provide display data to the electronic device 100, but the disclosure is not limited thereto. The timing controller 111 may control the display driving element 160 to drive the display panel 170 according to the display data.

In an embodiment, the control module 110 may be implemented in the form of an integrated circuit (IC) or a microcontroller unit (MCU). In another embodiment, at least one of the detection element 140, the first memory element 150, and the light emission controller 112 may also be disposed in the control module 110 or the timing controller 111, but the disclosure is not limited thereto.

In the embodiment, the light emitting module 130 may include a first substrate and multiple light emitting elements, and the light emitting elements may be disposed on the first substrate, wherein the first substrate may be a circuit substrate, but the disclosure is not limited thereto. The light emitting module 130 may be a light emitting diode (LED) backlight module or an organic light emitting diode (OLED) backlight module, but the disclosure is not limited thereto. The light emitting element may include a light emitting diode. The light emission driving element 120 may include a light emitting diode driving circuit. The light emission driving element 120 may generate a corresponding driving signal according to a control signal output by the control module 110, and drive the light emitting elements of the light emitting module 130.

In the embodiment, the display panel 170 may include a second substrate and multiple pixel elements, and the pixel elements may be disposed on the second substrate, wherein the material of the second substrate may be glass, quartz, ceramic, sapphire, polymer (for example, polyimide (PI), polyethylene terephthalate (PET)), other suitable materials, or a combination thereof, but the disclosure is not limited thereto. The display panel 170 may be a liquid crystal display (LCD) panel, but the disclosure is not limited thereto. The pixel element may include a liquid crystal unit. The display driving element 160 may include a liquid crystal driving circuit. The display driving element 160 may generate a corresponding driving signal according to the display data output by the control module 110, and drive the pixel elements of the display panel 170.

In the embodiment, the detection element 140 may include, for example, a light emitting diode, a transistor, a charge coupled device, etc. and may detect whether each of the pixel elements in the light emitting module 130 is defective through detecting an optical signal or an electrical signal. When the detection element 140 detects that at least one of the light emitting elements is defective, the detection element 140 may output an adjustment signal to the control module 110, so that the control module 110 may control at least one of the light emission driving element 120 and the display driving element 160 according to the adjustment signal, so as to adjust at least one of a brightness compensation distribution (that is, change a light emitting brightness ratio of at least one specific light emitting element) of the light emitting module 130 and a pixel compensation distribution (that is, change an aperture ratio of at least one specific pixel element, wherein the magnitude of a pixel value may correspond to the aperture ratio) of the display panel 180. It should be noted that the defective pixel element may refer to a pixel element that cannot emit light normally or emits insufficient light.

In the embodiment, the first memory element 150 may be a flash memory, and the second memory 1111 may be a random access memory (RAM), but the disclosure is not limited thereto. The first memory element 150 may pre-store at least one of a first brightness compensation table and a first pixel compensation table. The second memory element 111 may store at least one of a new first brightness compensation table and a new first pixel compensation table each time the electronic device 100 is activated.

Specifically, regarding the first brightness compensation table, during the production process of the light emitting module 130, the manufacturer may perform light emitting quality detection on the light emitting module 130, and may establish the first brightness compensation table according to the light emitting efficiency or brightness of the light emitting elements of the light emitting module 130. For example, for a light emitting element with lower brightness or other light emitting elements around the light emitting element with lower brightness, the first brightness compensation table may have a higher corresponding brightness compensation parameter. In contrast, for a light emitting element with higher brightness or other light emitting elements around the light emitting element with higher brightness, the first brightness compensation table may have a lower corresponding brightness compensation parameter, so that the light emitting module 130 can implement uniform overall light emitting brightness after leaving the factory.

Regarding the first pixel compensation table, the manufacturer may also establish the first pixel compensation table according to the light emitting efficiency or brightness of the light emitting elements of the light emitting module 130. For example, for a light emitting element with lower brightness, the first pixel compensation table may have a higher pixel compensation parameter to correspond to at least one pixel element corresponding to the light emitting element with lower brightness (in other words, the aperture ratio of at least one pixel element corresponding to the light emitting element with insufficient brightness may be increased, so that the amount of light passing through the at least one pixel element may be increased). In contrast, for a light emitting element with higher brightness, the first pixel compensation table may have a lower pixel compensation parameter to correspond to at least another pixel element corresponding to the light emitting element with higher brightness (in other words, the aperture ratio of at least one pixel element corresponding to the light emitting element with higher brightness may be lowered or maintained at a normal aperture ratio, so that the amount of light passing through the at least one pixel element may be reduced or maintained at normal).

Figure 2:
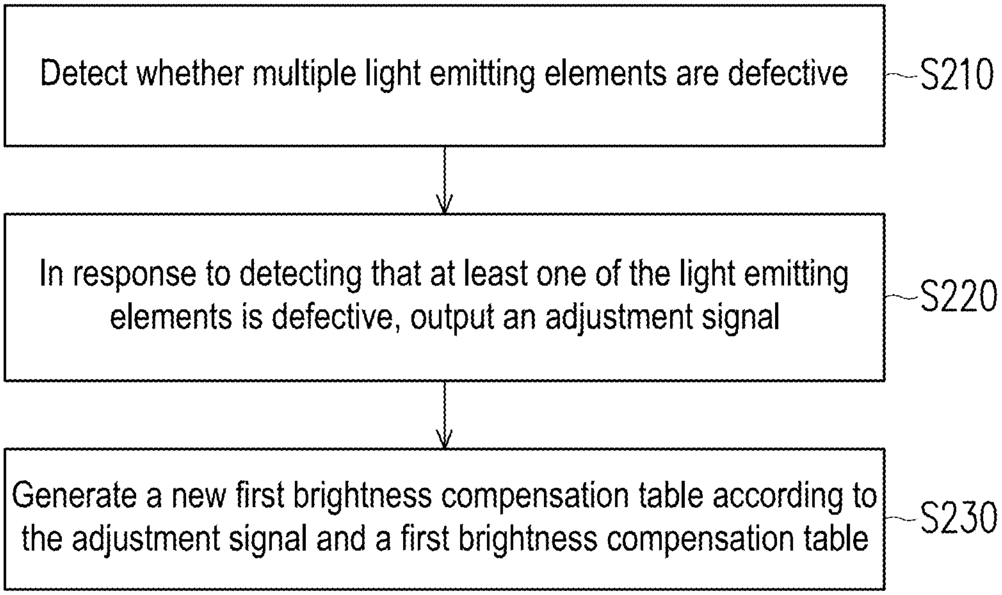
FIG. 2 is a flowchart of an operating method of an electronic device according to an embodiment of the disclosure.
Figure 3A:
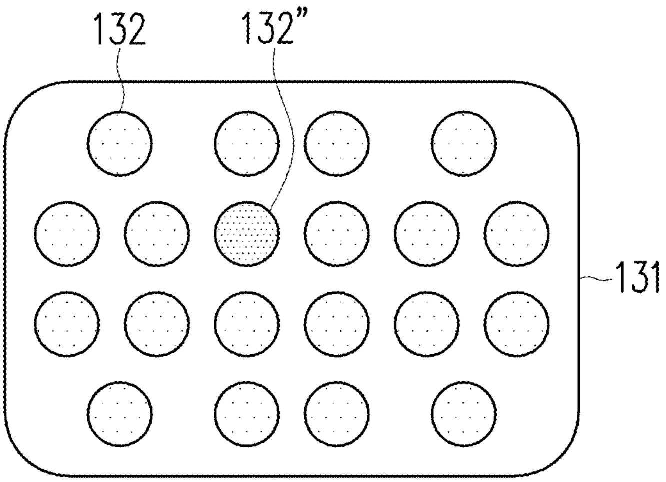
FIG. 3A is a schematic diagram of a light emitting module according to an embodiment of the disclosure.
Figure 3B:
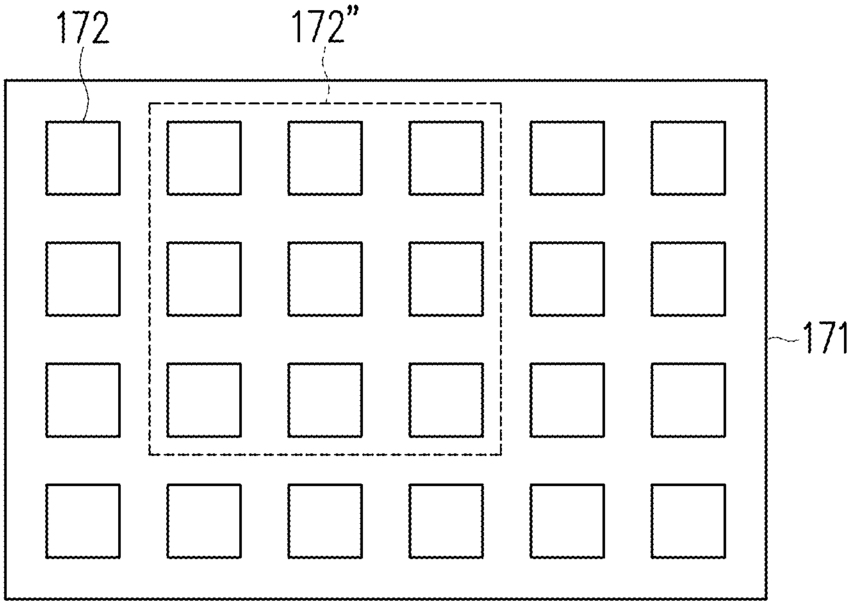
FIG. 3B is a schematic diagram of a display panel according to an embodiment of the disclosure.

FIG. 2 is a flowchart of an operating method of an electronic device according to an embodiment of the disclosure. FIG. 3A is a schematic diagram of a light emitting module according to an embodiment of the disclosure. FIG. 3B is a schematic diagram of a display panel according to an embodiment of the disclosure. Referring to FIG. 1 to FIG. 3B, at least part of the light emitting module 130 may be, for example, as shown in FIG. 3A, wherein the light emitting module 130 includes a first substrate 131 and multiple light emitting elements 132. At least part of the display panel 170 may be, for example, as shown in FIG. 3B, wherein the display panel 170 includes a second substrate 171 and multiple pixel elements 172. It is worth noting that the display panel 170 may be disposed above the light emitting module 130, and one light emitting element 132 of the light emitting module 130 may correspond to one or more pixel elements 172 of the display panel 170 in a light emission direction (also referred to as a display direction), but the disclosure is not limited thereto. The light emitting element 132 of the light emitting module 130 may serve as a light source of one or more pixel elements 172 of the display panel 170.

In the embodiment, the electronic device 100 may execute steps S210 to S230 below to effectively drive the light emitting module 130. In step S210, the detection element 140 may detect whether the light emitting elements 132 of the light emitting module 130 are defective. In step S220, in response to the detection element 140 detecting that at least one of the light emitting elements 132 is defective, the detection element 140 may output the adjustment signal to the control module 110. As shown in FIG. 3A, assuming that the detection element 140 detects that a light emitting element 132" is a defective light emitting element, the detection element 140 outputs the corresponding adjustment signal to the control module 110. In step S230, the control module 110 may generate the new first brightness compensation table according to the adjustment signal and the first brightness compensation table. In the embodiment, the detection element 140 may output the corresponding adjustment signal to the light emission controller 112 of the control module 110, wherein the adjustment signal may include a coordinate parameter corresponding to the defective light emitting element 132". The light emission controller 112 may modify the first brightness compensation table according to the coordinate parameter of the defective light emitting element 132" to generate the new first brightness compensation table, and store the new first brightness compensation table in the first memory element 150 (please refer to FIG. 1).

Figure 4:
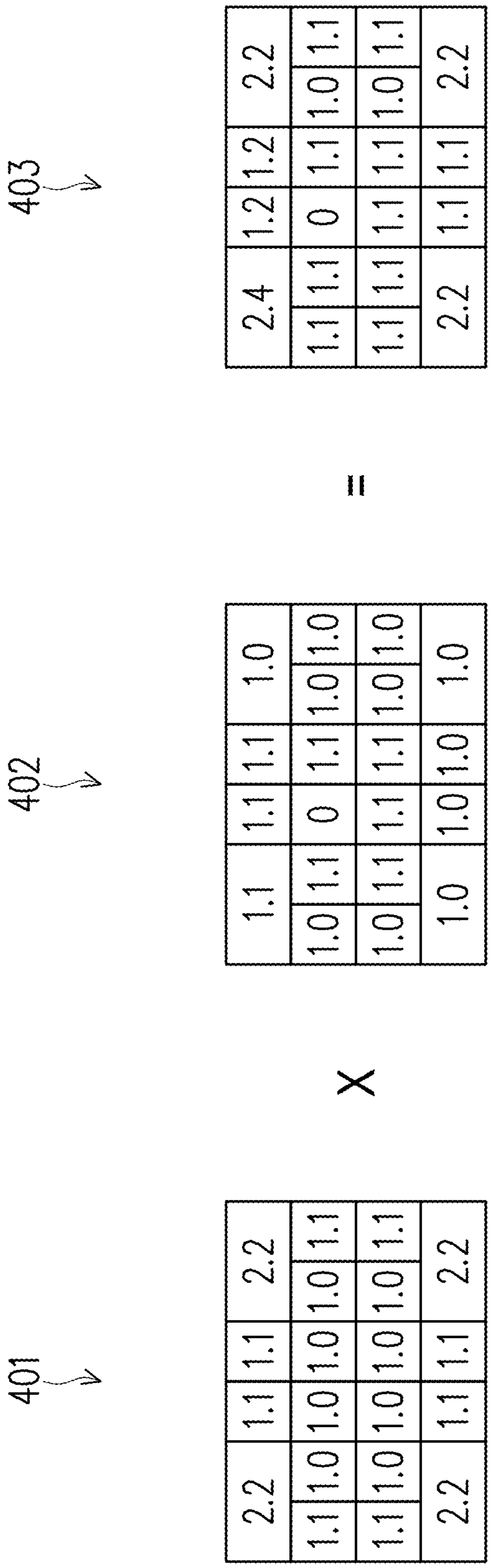
FIG. 4 is a schematic diagram of modifying a brightness compensation table according to an embodiment of the disclosure.

For example, referring to FIG. 3A and FIG. 4 together, FIG. 4 is a schematic diagram of modifying a brightness compensation table according to an embodiment of the disclosure. The first memory element 150 may pre-store a first brightness compensation table 401, wherein multiple first brightness compensation parameters of the first brightness compensation table 401 may be respectively used for the light emitting elements 132 in FIG. 3A. In the first brightness compensation table 401, the first brightness compensation parameters corresponding to the light emitting elements 132 disposed at the border of the first substrate 131 may be, for example, 1.1, the first brightness compensation parameters corresponding to the light emitting elements 132 disposed at the four corners of the first substrate 131 may be, for example, 2.2, and the first brightness compensation parameters corresponding to the light emitting elements 132 disposed at other positions of the first substrate 131 may be, for example, 1.0. The brightness compensation parameter may be used to represent a ratio of compensated brightness to normal brightness, but the disclosure is not limited thereto. FIG. 4 is only used to represent a numerical example, and the numerical representation of the brightness compensation table of the disclosure is not limited thereto.

When the detection element 140 detects that the light emitting element 132" is a defective light emitting element, the detection element 140 may output the coordinate parameter corresponding to the light emitting element 132" to the light emission controller 112, so that the light emission controller 112 may generate a second brightness compensation table 402 according to the coordinate parameter corresponding to the light emitting element 132", and multiply the first brightness compensation parameters of the first brightness compensation table 401 by multiple corresponding second brightness compensation parameters of the second brightness compensation table 402 one-to-one to generate a new first brightness compensation table 403 having multiple new first brightness compensation parameters. In the second brightness compensation table 402, the second brightness compensation parameter corresponding to the defective light emitting element 132" may be 0, and the second brightness compensation parameter corresponding to at least one light emitting element adjacent to the defective light emitting element may be greater than the second brightness compensation parameter of a normal light emitting element not adjacent to the defective light emitting element. As shown in the second brightness compensation table 402 in FIG. 4, the second brightness compensation parameters of the light emitting elements adjacent to the defective light emitting element may be 1.1, and the second brightness compensation parameters of the normal light emitting elements not adjacent to the defective light emitting element may be 1.0.

However, the numerical distribution of the second brightness compensation parameters of the second brightness compensation table of the disclosure is not limited to as shown in FIG. 4. In an embodiment, the values of the second brightness compensation parameters of the second brightness compensation table may progressively decrease in sequence toward the periphery with the defective light emitting element as the center, and the manner of progressively decreasing the values is not limited in the disclosure. For another example, in another embodiment, the values of the second brightness compensation parameters of the second brightness compensation table may also have the same higher values corresponding to multiple parameters within a preset range of the defective light emitting element.

In this regard, the light emission controller 112 may store the new first brightness compensation table 403 in the first memory element 150, and the first memory element 150 may replace the first brightness compensation table 401 with the new first brightness compensation table 403. Next, the timing controller 111 may read the first memory element 150 to store the new first brightness compensation table 403 in the second memory element 1111, generate corresponding control signals according to multiple new first brightness compensation parameters of the new first brightness compensation table 403, and output the corresponding control signals to the light emission driving element 120, so that the light emission driving element 120 may drive the light emitting elements 132 of the light emitting module 130 according to the corresponding control signals. As shown in the new first brightness compensation table 403 in FIG. 4, since the brightness compensation parameter corresponding to the defective light emitting element is 0, the light emitting module 130 does not drive the defective light emitting element and performs brightness compensation through increasing brightness of multiple light emitting elements adjacent to the defective light emitting element. In this way, the influence of uneven brightness caused by the defective light emitting element can be effectively reduced.

In addition, the timing controller 111 of the embodiment may also read the original first pixel compensation table stored in the first memory element 150, and control the display driving element 160 to drive the display panel 170 according to the original first pixel compensation table.

However, in an embodiment, the light emission controller 112 may also output the coordinate parameter corresponding to the defective light emitting element to the timing controller 111. The timing controller 111 may have a corresponding arithmetic algorithm, read the first brightness compensation table 401 stored in the first memory element 150 each time the electronic device 100 is reactivated, and store the first brightness compensation table 401 in the second memory element 1111. The timing controller 111 may modify the first brightness compensation table 401 according to the coordinate parameter corresponding to the defective light emitting element 132" to generate the new first brightness compensation table 403. The timing controller 111 may generate the new first brightness compensation table 403 in the manner described above in FIG. 4, and store the new first brightness compensation table 403 in the second memory element 1111. Furthermore, the timing controller 111 or the light emission controller 112 may also store at least one of the second brightness compensation table 402 and the new first brightness compensation table 403 in the first memory element 150.

In addition, in another embodiment, the light emission controller 112 or the timing controller 111 may also generate the new first brightness compensation table 403 through directly modifying the first brightness compensation table 401 without establishing the second brightness compensation table 402.

Figure 5:
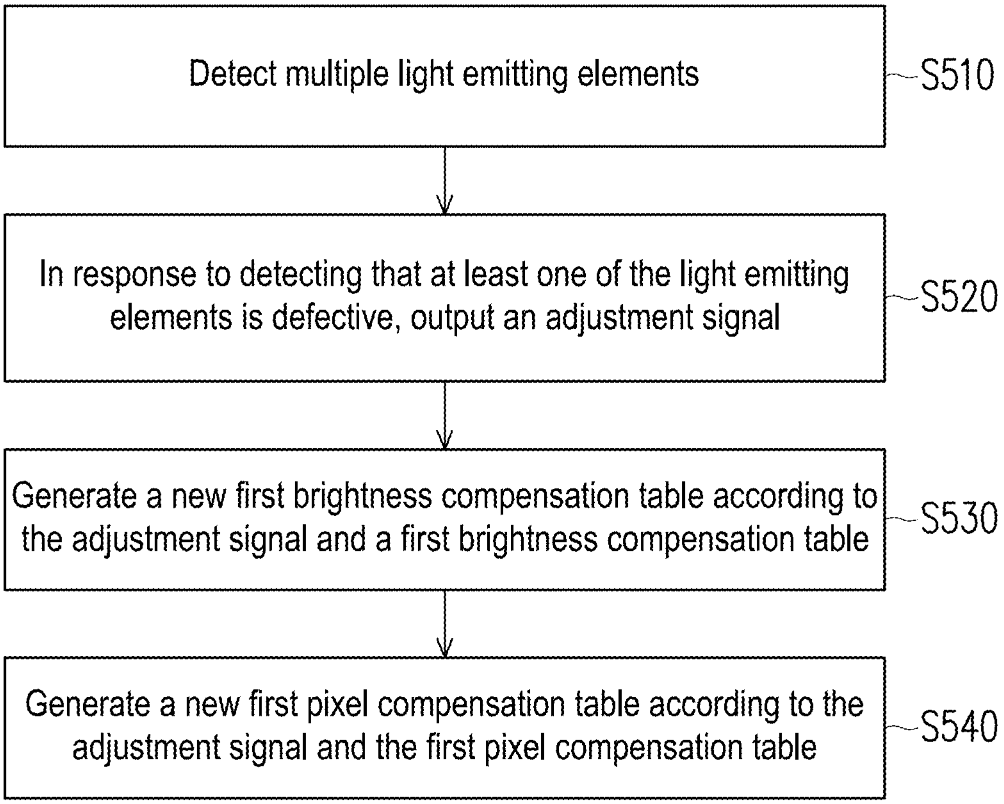
FIG. 5 is a flowchart of an operating method of an electronic device according to an embodiment of the disclosure.

FIG. 5 is a flowchart of an operating method of an electronic device according to an embodiment of the disclosure. Referring to FIG. 1, FIG. 3A, FIG. 3B, and FIG. 5, in the embodiment, the electronic device 100 may execute steps S510 to S540 below to effectively drive the light emitting module 130 and the display panel 170. In step S510, the detection element 140 may detect whether the light emitting elements 132 of the light emitting module 130 are defective. In step S520, in response to the detection element 140 detecting that at least one of the light emitting elements 132 is defective, the detection element 140 may output the adjustment signal to the control module 110. As shown in FIG. 3A, assuming that the detection element 140 detects that the light emitting element 132" is a defective light emitting element, the detection element 140 outputs the corresponding adjustment signal to the control module 110. In step S530, the control module 110 may generate the new first brightness compensation table according to the adjustment signal and the first brightness compensation table. In step S540, the control module 110 may generate the new first pixel compensation table according to the adjustment signal and the first pixel compensation table.

In the embodiment, the detection element 140 may output the corresponding adjustment signal to the light emission controller 112 of the control module 110, wherein the adjustment signal may include the coordinate parameter corresponding to the defective light emitting element 132". The light emission controller 112 may modify the first brightness compensation table and the first pixel compensation table according to the coordinate parameter of the defective light emitting element 132" to generate the new first brightness compensation table and the new first pixel compensation table, and store the new first brightness compensation table and the new first pixel compensation table in the first memory element 150.

The manner of generating the new first brightness compensation table may be as described in the embodiment of FIG. 4 above, so there will be no elaboration herein. Regarding the manner of generating the new first pixel compensation table, for example, referring to FIG. 6 together, FIG. 6 is a schematic diagram of modifying a pixel compensation table according to an embodiment of the disclosure. The first memory element 150 may pre-store a first pixel compensation table 601, wherein multiple first brightness compensation parameters of the first pixel compensation table 601 may be respectively used for the pixel elements 172 in FIG. 3B. In the first pixel compensation table 601, multiple first pixel compensation parameters corresponding to the pixel elements 172 may be, for example, 1. The pixel compensation parameter may be used to represent a ratio of an aperture ratio (or a pixel value or a grayscale value) of a compensated pixel to an aperture ratio of a normal pixel, but the disclosure is not limited thereto. FIG. 6 is only used to represent a numerical example, and the numerical representation of the pixel compensation table of the disclosure is not limited thereto.

When the detection element 140 detects that the light emitting element 132" is a defective light emitting element, the detection element 140 may output the coordinate parameter corresponding to the light emitting element 132" to the light emission controller 112, so that the light emission controller 112 may generate a second pixel compensation table 602 according to the coordinate parameter corresponding to the light emitting element 132", and multiply the first pixel compensation parameters of the first pixel compensation table 601 by multiple corresponding second pixel compensation parameters of the second pixel compensation table 602 one-to-one to generate a new first pixel compensation table 603 having multiple new first pixel compensation parameters. In the second pixel compensation table 602, multiple second pixel compensation parameters of multiple pixel elements 172" corresponding to the defective light emitting element 132" are higher than other second pixel compensation parameters corresponding to the normal light emitting element.

As shown in the second pixel compensation table 602 of FIG. 3B and FIG. 6, the second pixel compensation parameter of the pixel element at the center position among the pixel elements 172" corresponding to the light emitting element 132" may be 1.5, the second pixel compensation parameters of other pixel elements among the pixel elements 172" corresponding to the light emitting element 132" may be 1.1, and the other second pixel compensation parameters corresponding to the normal light emitting element may be 1.0.

However, the numerical distribution of the second pixel compensation parameters of the second pixel compensation table of the disclosure is not limited to as shown in FIG. 6. In an embodiment, the values of the second pixel compensation parameters of the second pixel compensation table may progressively decrease in sequence toward the periphery with the defective light emitting element as the center, and the manner of progressively decreasing the values is not limited in the disclosure. For another example, in another embodiment, the values of the second pixel compensation parameters of the second pixel compensation table may also have the same higher values corresponding to multiple parameters within a preset range of the defective light emitting element.

In this regard, the light emission controller 112 may store the new first pixel compensation table 603 in the first memory element 150, and the first memory element 150 may replace the first pixel compensation table 601 with the new first pixel compensation table 603. Next, the timing controller 111 may read the first memory element 150 to store the new first pixel compensation table 603 in the second memory element 1111, generate the corresponding display data according to the new first pixel compensation parameters of the new first pixel compensation table 603, and output the corresponding display data to the display driving element 160, so that the display driving element 160 may drive the pixel elements 172 of the display panel 170 according to the corresponding display data. As shown in the new first pixel compensation table 603 of FIG. 6, since the values of the pixel compensation parameters of the pixel elements corresponding to the defective light emitting element are higher than other pixel compensation parameters, the pixel elements of the display panel 170 corresponding to positions with light emission defects may be correspondingly adjusted to have higher aperture ratios. In this way, uneven display brightness of a display image caused by the defective light emitting element can be effectively reduced.

However, in an embodiment, the light emission controller 112 may also output the coordinate parameter corresponding to the defective light emitting element to the timing controller 111. The timing controller 111 may have a corresponding arithmetic algorithm, read the first pixel compensation table 601 stored in the first memory element 150 each time the electronic device 100 is reactivated, and store the first pixel compensation table 601 in the second memory element 1111. The timing controller 111 may modify the first pixel compensation table 601 according to the coordinate parameter corresponding to the defective light emitting element 132" to generate the new first pixel compensation table 603. The timing controller 111 may generate the new first pixel compensation table 603 in the manner described above in FIG. 6, and store the new first pixel compensation table 603 in the second memory element 1111. Furthermore, the timing controller 111 or the light emission controller 112 may also store at least one of the second pixel compensation table 602 and the new first pixel compensation table 603 in the first memory element 150.

In addition, in another embodiment, the light emission controller 112 or the timing controller 111 may also generate the new first pixel compensation table 603 through directly modifying the first pixel compensation table 601 without establishing the second pixel compensation table 602.

Figure 7:
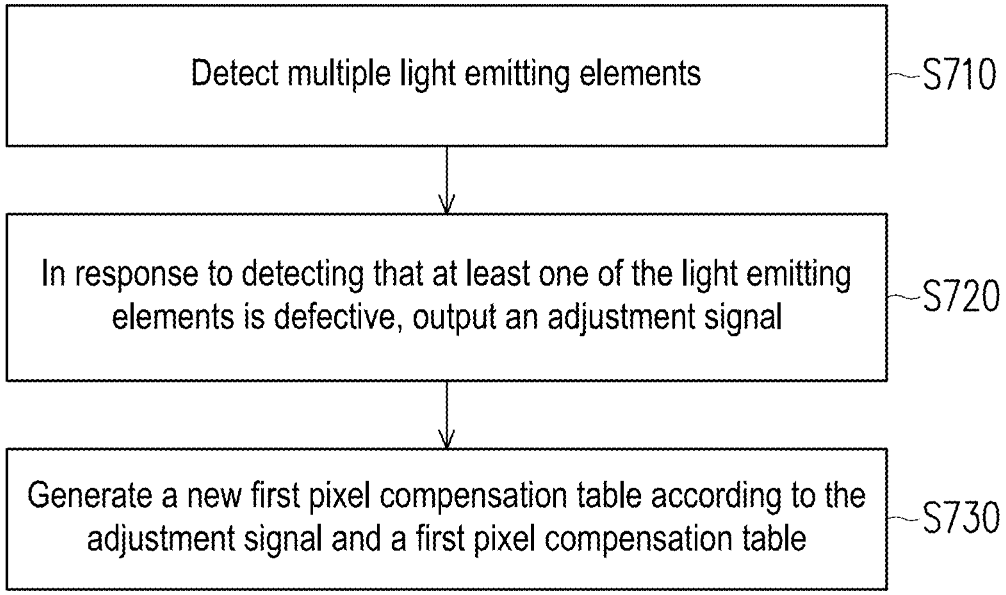
FIG. 7 is a flowchart of an operating method of an electronic device according to an embodiment of the disclosure.

FIG. 7 is a flowchart of an operating method of an electronic device according to an embodiment of the disclosure. Referring to FIG. 1, FIG. 3A, FIG. 3B, and FIG. 7, in the embodiment, the electronic device 100 may execute steps S710 to S730 below to effectively drive the display panel 170. In step S710, the detection element 140 may detect whether the light emitting elements 132 of the light emitting module 130 are defective. In step S720, in response to the detection element 140 detecting that at least one of the light emitting elements 132 is defective, the detection element 140 may output the adjustment signal to the control module 110. As shown in FIG. 3A, assuming that the detection element 140 detects that the light emitting element 132" is a defective light emitting element, the detection element 140 outputs the corresponding adjustment signal to the control module 110. In step S730, the control module 110 may generate the new first pixel compensation table according to the adjustment signal and the first pixel compensation table.

In the embodiment, the detection element 140 may output the corresponding adjustment signal to the light emission controller 112 of the control module 110, wherein the adjustment signal may include the coordinate parameter corresponding to the defective light emitting element 132". The light emission controller 112 may modify the first pixel compensation table according to the coordinate parameter corresponding to the defective light emitting element 132" to generate the new first pixel compensation table, and store the new first pixel compensation table in the first memory element 150.

The manner of generating the new first pixel compensation table may be as described in the embodiment of FIG. 6 above, so there will be no elaboration herein. Moreover, as shown in the new first pixel compensation table 603 of FIG. 6, since the values of the pixel compensation parameters of the pixel elements corresponding to the defective light emitting element are higher than the other pixel compensation parameters, the pixel elements of the display panel 170 corresponding to the positions with the light emission defects may be correspondingly adjusted to have higher aperture ratios. In this way, the uneven display brightness of the display image caused by the defective light emitting element can be effectively reduced.

In addition, the timing controller 111 of the embodiment may also read the original first brightness compensation table stored in the first memory element 150, and control the light emission driving element 120 to drive the light emitting module 130 according to the original first brightness compensation table.

Figure 8:
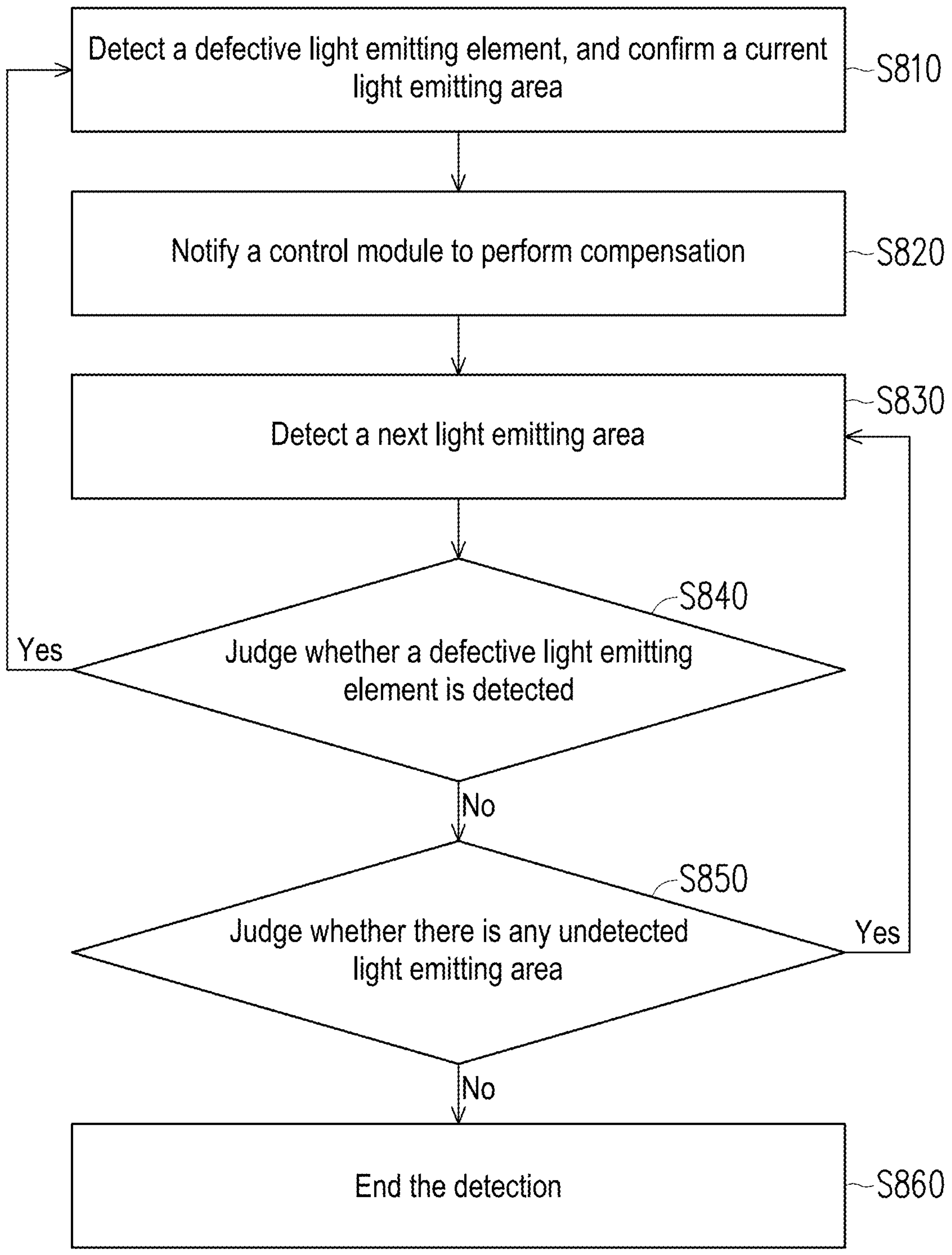
FIG. 8 is a flowchart of an operating method of an electronic device according to an embodiment of the disclosure.

FIG. 8 is a flowchart of an operating method of an electronic device according to an embodiment of the disclosure. Referring to FIG. 1 and FIG. 8, the electronic device 100 may execute steps S810 to S860 below to effectively detect the light emitting elements of the light emitting module 130, wherein the light emitting elements of the light emitting module 130 may be divided into multiple light emitting areas. In step S810, the detection element 140 detects the defective light emitting element, and confirms a current light emitting area in the light emitting module 130. In step S820, the detection element 140 may output the adjustment signal to the control module 110 to notify the control module 110 to perform compensation. Regarding the manner of the control module 110 performing compensation, reference may be made to the description of the embodiments shown in FIG. 2 to FIG. 7 above, so there will be no elaboration herein. In step S830, the detection element 140 may detect a next light emitting area in the light emitting module 130. In step S840, the detection element 140 may judge whether a defective light emitting element is detected. If yes, step S810 is executed. If no, step S850 is executed. In step S850, the detection element 140 may judge whether there is any undetected light emitting area. If yes, step S830 is executed. If no, step S860 is executed to end the detection.

Figure 9:
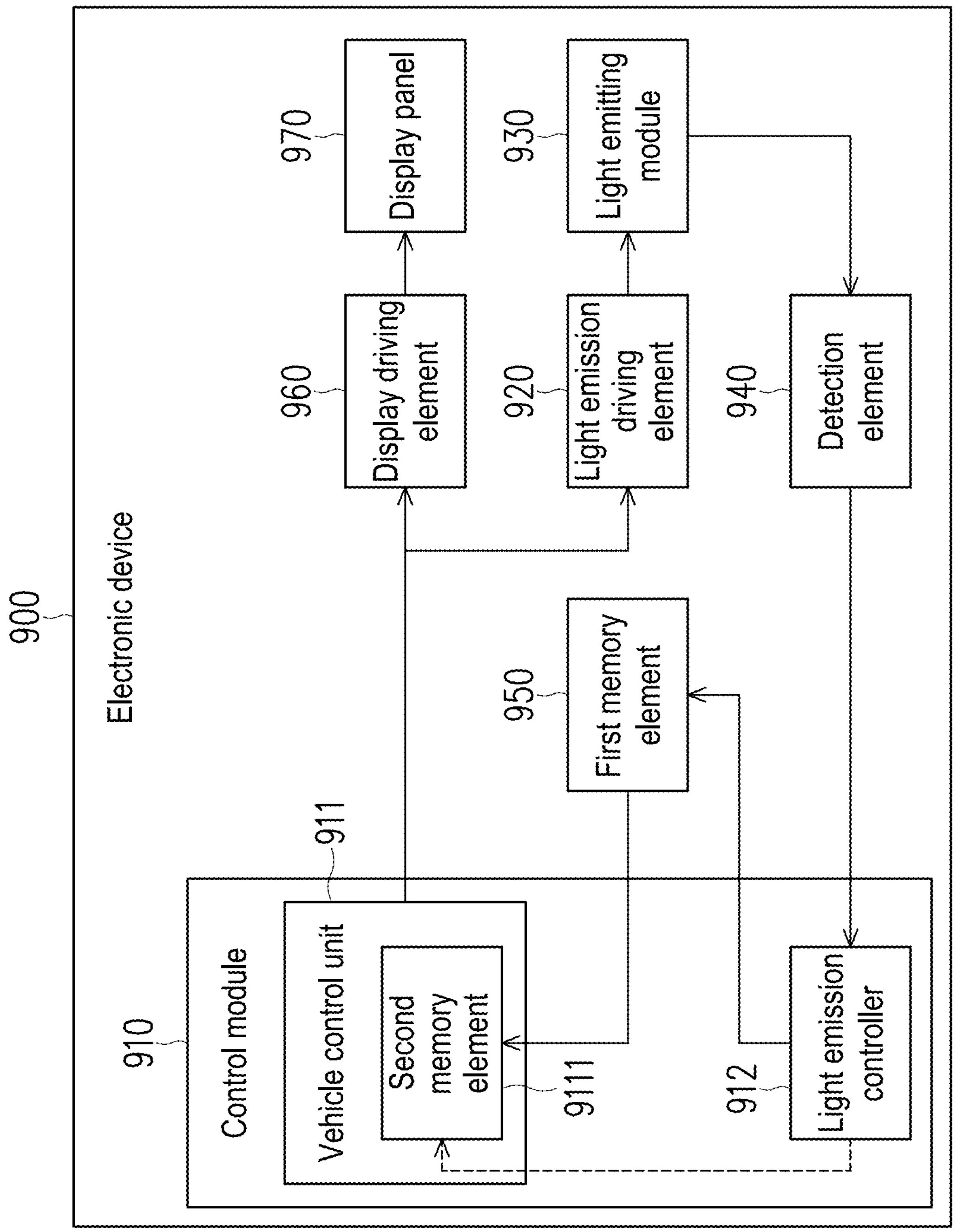
FIG. 9 is a schematic diagram of an electronic device according to an embodiment of the disclosure.

FIG. 9 is a schematic diagram of an electronic device according to an embodiment of the disclosure. Referring to FIG. 9, an electronic device 900 includes a control module 910, a light emission driving element 920, a light emitting module 930, a detection element 940, a first memory element 950, a display driving element 960, and a display panel 970. The control module 910 is electrically connected to the light emission driving element 920, the detection element 940, the first memory element 950, and the display driving element 960. The light emission driving element 920 is also electrically connected to the light emitting module 930. The detection element 940 is also electrically connected to the light emitting module 930. The display driving element 960 is also electrically connected to the display panel 970.

In the embodiment, the control module 910 includes a vehicle control unit (VCU) 911 and a light emission controller 912. The vehicle control unit 911 is electrically connected to the light emission controller 912, the light emission driving element 920, the first memory element 950, and the display driving element 960. The vehicle control unit 911 may include a second memory element 9111. The light emission controller 912 is also electrically connected to the detection element 940 and the first memory element 950. In the embodiment, the vehicle control unit 911 may control the display driving element 960 to drive the display panel 970 according to display data.

Compared to the embodiment of FIG. 1, the control module 910 of FIG. 9 may also be implemented by the vehicle control unit 911 and the light emission controller 912. In the embodiment, the vehicle control unit 911 may perform all operations performed by the timing controller 111 in the embodiments of FIG. 1 to FIG. 8 above, so there will be no elaboration herein.

Figure 10:
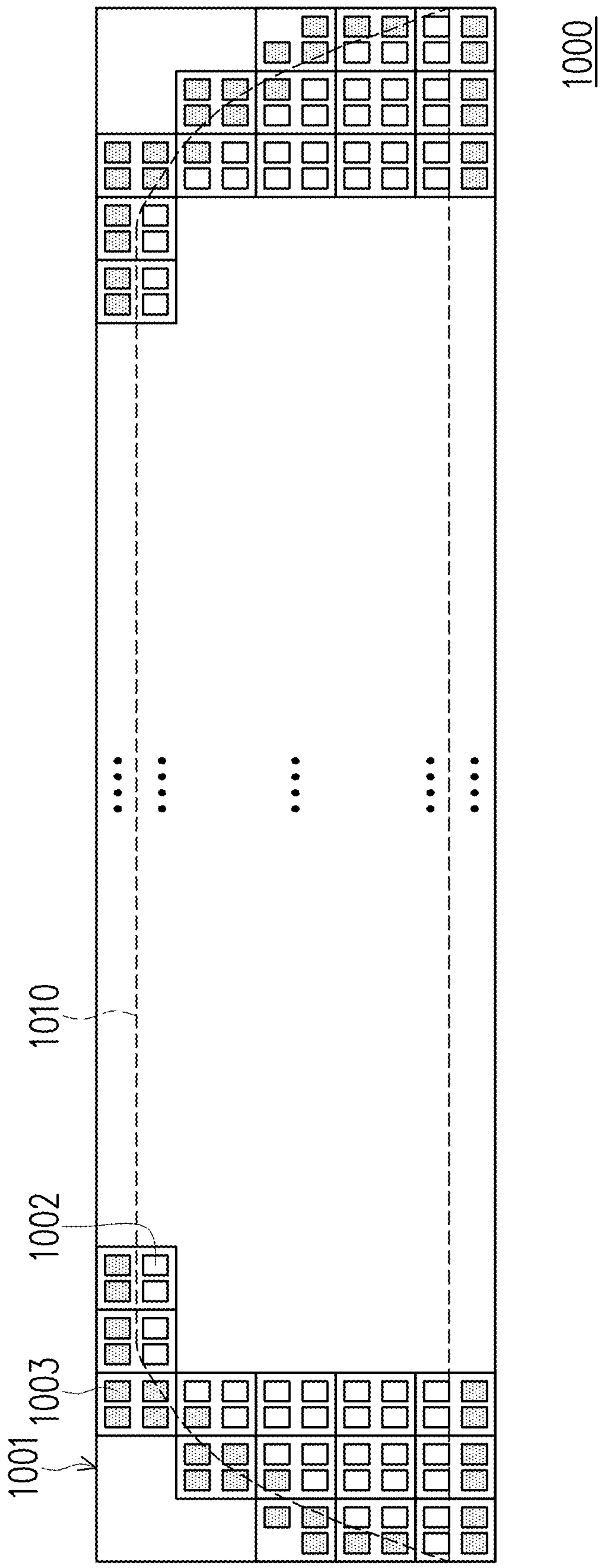
FIG. 10 is a schematic diagram of a light emitting module according to an embodiment of the disclosure.

FIG. 10 is a schematic diagram of a light emitting module according to an embodiment of the disclosure. Referring to FIG. 10, the light emitting module of the disclosure may also implement the architecture shown in FIG. 10. In the embodiment, a light emitting module 1000 includes a substrate 1001 and multiple light emitting elements, wherein the light emitting elements are disposed on the substrate 1001. In the embodiment, the light emitting elements may include multiple light emitting elements 1002 corresponding to an active area (AA) 1010 of a display panel and also include multiple light emitting elements 1003 corresponding to a peripheral area outside the active area 1010 of the display panel. In this regard, if backlight is provided to the border position corresponding to the active area 1010 of the display panel by only the light emitting elements 1002 corresponding to the active area 1010, brightness thereof may be insufficient. Therefore, the light emitting module 1000 of the embodiment is further provided with the light emitting elements 1003 in the peripheral area outside the active area 1010 to effectively compensate for the brightness at the border position corresponding to the active area 1010. It should be noted that "corresponding to" described here may mean that a projection of an element or/and a region in a normal direction of an electronic device may overlap with another element or/and region. For example, the light emitting elements 1002 may correspond to the active area of the display panel. In other words, the projections of the light emitting elements 1002 in the normal direction of the electronic device may overlap with the active area of the display panel.

Figure 11:
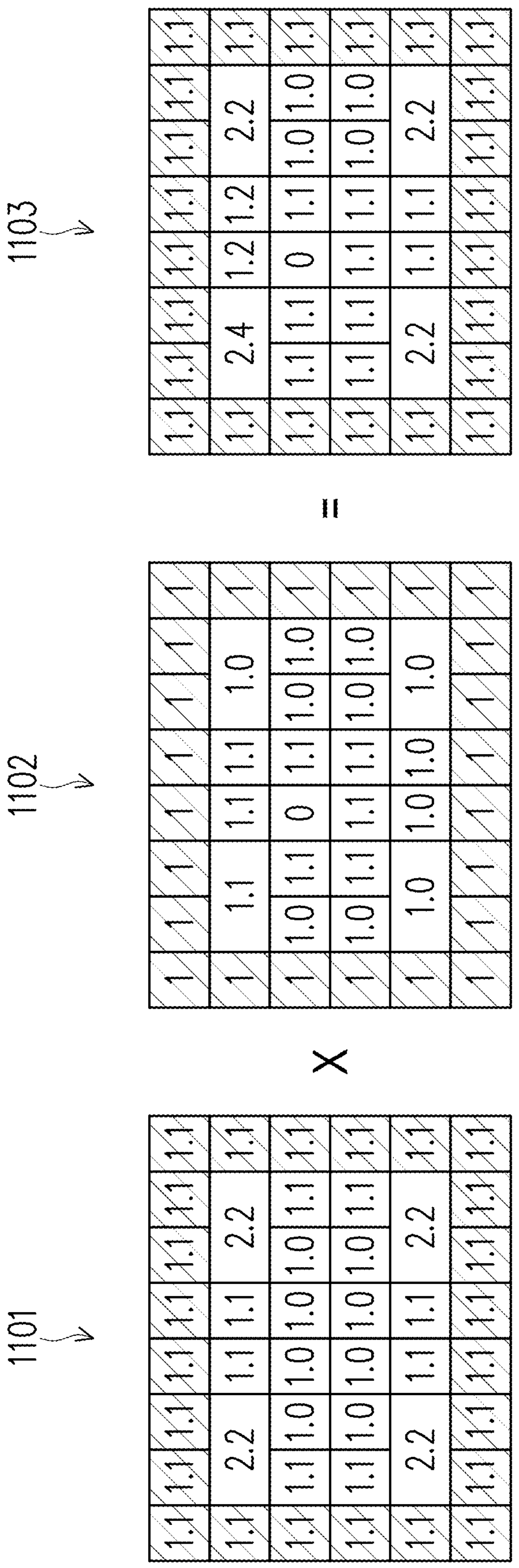
FIG. 11 is a schematic diagram of modifying a brightness compensation table according to an embodiment of the disclosure.

FIG. 11 is a schematic diagram of modifying a brightness compensation table according to an embodiment of the disclosure. Referring to FIG. 11, based on the architecture of the light emitting module 1000 in FIG. 10, the brightness compensation table of the disclosure may also be as shown in FIG. 11. In the embodiment, multiple first brightness compensation parameters of a first brightness compensation table 1101 may include the light emitting elements 1002 for use in the active region 1010 as shown in FIG. 10 and the light emitting elements 1003 for use outside the active region 1010. Furthermore, multiple second brightness compensation parameters of a second brightness compensation table 1102 may also include the light emitting elements 1002 for use in the active region 1010 as shown in FIG. 10 and the light emitting elements 1003 for use outside the active region 1010. Furthermore, multiple new first brightness compensation parameters of a new first brightness compensation table 1103 may include the light emitting elements 1002 for use in the active region 1010 as shown in FIG. 10 and the light emitting elements 1003 for use outside the active region 1010.

It is worth noting that the brightness compensation parameters of the light emitting elements 1003 for use outside the active area 1010 shown in FIG. 10 may also be correspondingly adjusted according to the position of the defective light emitting element and are not limited to as shown in FIG. 11. In other words, assuming that the position of the defective light emitting element is located at the border position of the active area 1010 as shown in FIG. 10, the embodiment can effectively perform brightness compensation through increasing the brightness of at least one light emitting element 1003 adjacent to the position of the defective light emitting element outside the active area 1010.

In summary, the electronic device of the disclosure automatically detect whether the light emitting elements of the light emitting module are defective, and can automatically correspondingly adjust at least one of the brightness compensation table and the pixel compensation table, so as to effectively reduce the influence of uneven brightness caused by the defective light emitting element, and enable the display image to present uniform display brightness.

Finally, it should be noted that the above embodiments are only configured to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An electronic device, comprising:

a first substrate;

a plurality of light emitting elements, disposed on the first substrate;

a second substrate;

a plurality of pixel elements, disposed on the second substrate;

a light emission driving element, electrically connected to the plurality of light emitting elements;

a detection element, electrically connected to the plurality of light emitting elements and configured to detect whether the plurality of light emitting elements are defective;

a control circuit, electrically connected to the detection element and the light emission driving element;

a display driving element, electrically connected to the plurality of pixel elements and the control circuit; and a first memory element, electrically connected to the control circuit and configured to store a first brightness compensation table, wherein in response to the detection element detecting that at least one of the plurality of light emitting elements is defective, the detection element outputs an adjustment signal to the control circuit, wherein the control circuit generates a new first brightness compensation table according to the adjustment signal and the first brightness compensation table, and outputs a control signal to the light emission driving element according to the new first brightness compensation table, so that the light emission driving element drives the plurality of light emitting elements according to the control signal, wherein the control circuit comprises:

a light emission controller, electrically connected to the detection element and configured to receive the adjustment signal; and a timing controller, electrically connected to the light emission controller and the light emission driving element, and configured to output the control signal, wherein the timing controller comprises a second memory element, and the second memory element is configured to store the new first brightness compensation table, wherein the first memory element is further configured to store a first pixel compensation table, wherein the control circuit further generates a new first pixel compensation table according to the adjustment signal and the first pixel compensation table, and the control circuit outputs display data to the display driving element according to the new first pixel compensation table, so that the display driving element drives the plurality of pixel elements according to the display data, wherein the control circuit generates a second pixel compensation table according to the adjustment signal, and multiplies a plurality of first pixel compensation parameters of the first pixel compensation table by a plurality of corresponding second pixel compensation parameters of the second pixel compensation table to generate the new first pixel compensation table having a plurality of new first pixel compensation parameters.

2. The electronic device according to claim 1, wherein the adjustment signal comprises a coordinate parameter corresponding to a defective light emitting element, and the light emission controller modifies the first brightness compensation table according to the coordinate parameter corresponding to the defective light emitting element to generate the new first brightness compensation table, and stores the new first brightness compensation table in the first memory element.

3. The electronic device according to claim 2, wherein the first memory element replaces the first brightness compensation table with the new first brightness compensation table.

4. The electronic device according to claim 1, wherein the adjustment signal comprises a coordinate parameter corresponding to a defective light emitting element, and the light emission controller outputs the coordinate parameter corresponding to the defective light emitting element to the timing controller, wherein the timing controller modifies the first brightness compensation table according to the coordinate parameter corresponding to the defective light emitting element to generate the new first brightness compensation table.

5. The electronic device according to claim 1, wherein the first memory element is a flash memory, and the second memory is a random access memory.

6. The electronic device according to claim 1, wherein the control circuit comprises:

a light emission controller, electrically connected to the detection element and configured to receive the adjustment signal; and a vehicle control unit, electrically connected to the light emission controller and the light emission driving element, and configured to output the control signal, wherein the vehicle control unit comprises a second memory element, and the second memory element is configured to store the new first brightness compensation table.

7. The electronic device according to claim 1, wherein the control circuit generates a second brightness compensation table according to the adjustment signal, and multiplies a plurality of first brightness compensation parameters of the first brightness compensation table by a plurality of corresponding second brightness compensation parameters of the second brightness compensation table to generate the new first brightness compensation table having a plurality of new first brightness compensation parameters.

8. The electronic device according to claim 7, wherein the second brightness compensation parameter corresponding to a defective light emitting element in the second brightness compensation table is 0.

9. The electronic device according to claim 7, wherein the second brightness compensation parameter corresponding to at least one light emitting element adjacent to a defective light emitting element in the second brightness compensation table is greater than the second brightness compensation parameter of at least another normal light emitting element not adjacent to the defective light emitting element.

10. The electronic device according to claim 1, wherein the at least one second pixel compensation parameter of the at least one pixel element corresponding to a defective light emitting element in the second pixel compensation table is higher than the at least another second pixel compensation parameter corresponding to the normal light emitting element in the second pixel compensation table.

11. An electronic device, comprising:

a first substrate;

a second substrate;

a plurality of light emitting elements, disposed on the first substrate;

a plurality of pixel elements, disposed on the second substrate;

a display driving element, electrically connected to the plurality of pixel elements;

a detection element, electrically connected to the plurality of light emitting elements and configured to detect whether the plurality of light emitting elements are defective;

a control circuit, electrically connected to the detection element and the display driving element;

a light emission driving element, electrically connected to the plurality of light emitting elements and the control circuit; and a first memory element, electrically connected to the control circuit and configured to store a first pixel compensation table, wherein in response to the detection element detecting that at least one of the plurality of light emitting elements is defective, the detection element outputs an adjustment signal to the control circuit, wherein the control circuit generates a new first pixel compensation table according to the adjustment signal and the first pixel compensation table, and the control circuit outputs display data to the display driving element according to the new first pixel compensation table, so that the display driving element drives the plurality of pixel elements according to the display data, wherein the control circuit comprises:

a light emission controller, electrically connected to the detection element and configured to receive the adjustment signal; and a timing controller, electrically connected to the light emission controller and the display driving element, and configured to output the display data, wherein the timing controller comprises a second memory element, and the second memory element is configured to store the new first pixel compensation table, wherein the first memory element is further configured to store a first brightness compensation table, wherein the control circuit further generates a new first brightness compensation table according to the adjustment signal and the first brightness compensation table, and the control circuit outputs a control signal to the light emission driving element according to the new first brightness compensation table, so that the light emission driving element drives the plurality of light emitting elements according to the control signal, wherein the control circuit generates a second brightness compensation table according to the adjustment signal, and multiplies a plurality of first brightness compensation parameters of the first brightness compensation table by a plurality of corresponding second brightness compensation parameters of the second brightness compensation table to generate the new first brightness compensation table having a plurality of new first brightness compensation parameters.

12. The electronic device according to claim 11, wherein the adjustment signal comprises a coordinate parameter corresponding to a defective light emitting element, and the light emission controller modifies the first pixel compensation table according to the coordinate parameter corresponding to the defective light emitting element to generate the new first pixel compensation table, and stores the new first pixel compensation table in the first memory element.

13. The electronic device according to claim 12, wherein the first memory element replaces the first pixel compensation table with the new first pixel compensation table.

14. The electronic device according to claim 11, wherein the adjustment signal comprises a coordinate parameter corresponding to a defective light emitting element, and the light emission controller outputs the coordinate parameter corresponding to the defective light emitting element to the timing controller, wherein the timing controller modifies the first pixel compensation table according to the coordinate parameter corresponding to the defective light emitting element to generate the new first pixel compensation table.

15. The electronic device according to claim 11, wherein the first memory element is a flash memory, and the second memory is a random access memory.

16. The electronic device according to claim 11, wherein the control circuit comprises:

a light emission controller, electrically connected to the detection element and configured to receive the adjustment signal; and a vehicle control unit, electrically connected to the light emission controller and the display driving element, and configured to output the display data, wherein the vehicle control unit comprises a second memory element, and the second memory element is configured to store the new first pixel compensation table.

* * * * *